(12) United States Patent
Kuhara

(10) Patent No.: US 6,859,601 B2
(45) Date of Patent: Feb. 22, 2005

(54) OPTICAL WAVEGUIDE-INTEGRATED SUBSTRATE, METHOD FOR PRODUCING THE SUBSTRATE, AND OPTICAL TRANSCEIVER USING THE SUBSTRATE

(75) Inventor: Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 184 days.

(21) Appl. No.: 10/225,347

(22) Filed: Aug. 22, 2002

(65) Prior Publication Data

US 2003/0053736 A1 Mar. 20, 2003

(30) Foreign Application Priority Data

Sep. 20, 2001 (JP) ........................................ 2001-286945

(51) Int. Cl.$^7$ ............................................... G02B 6/10
(52) U.S. Cl. ......................................................... 385/129
(58) Field of Search ................................. 385/129, 130, 385/131, 132

(56) References Cited

U.S. PATENT DOCUMENTS

| | | | | |
|---|---|---|---|---|
| 4,760,569 A | * | 7/1988 | Mahlein | 398/139 |
| 5,859,941 A | * | 1/1999 | Horita et al. | 385/37 |
| 6,320,992 B1 | * | 11/2001 | Goldner et al. | 385/13 |
| 6,411,765 B1 | * | 6/2002 | Ono | 385/131 |
| 6,549,708 B2 | * | 4/2003 | Worchesky et al. | 385/37 |

FOREIGN PATENT DOCUMENTS

| | | |
|---|---|---|
| JP | 8-110431 | 4/1996 |
| JP | 11-68705 | 3/1999 |

OTHER PUBLICATIONS

Takahashi, et al., "Packaging of optical semicondutor chips for SFF optical transceiver", "Proceedings of the 1999 Electronics Society Conference of IEICE (The Institute of Electronics, Information and Communication Engineers of Japan)," vol. 1, No. C–3–28, p. 133 and English translation thereof.

Tatemi Ido, "Polymer PLC Transceiver Module" Central Research Lab, Hitachi Ltd. (Mar. 2001) and English translation.

* cited by examiner

Primary Examiner—Diane I. Lee
(74) Attorney, Agent, or Firm—Smith, Gambrell & Russell, LLP

(57) ABSTRACT

An optical waveguide-integrated substrate includes a first optical waveguide on part of one side (referred to as the first side) of a substrate and a second optical waveguide on part of the other side (referred to as the second side) of the substrate. Both optical waveguides include a core and a cladding layer enclosing the core. A method for producing an optical waveguide-integrated substrate inpludes preparing a substrate, forming a first optical waveguide on part of the first side of the substrate, and forming a second optical waveguide on part of the second side of the substrate at a temperature different from that for forming the first optical waveguide. An optical transceiver includes the optical waveguide-integrated substrate, at least one optical-signal-transmitting device mounted on the remaining part of the first side of the substrate, and at least one optical-signal-receiving device mounted on the remaining part of the second side of the substrate.

17 Claims, 6 Drawing Sheets

A

PRIOR ART

OPTICAL WAVEGUIDE-INTEGRATED SUBSTRATE, METHOD FOR PRODUCING THE SUBSTRATE, AND OPTICAL TRANSCEIVER USING THE SUBSTRATE

BACKGROUND OF THE INVENTION

1. Field of the Invention

The present invention relates to an optical waveguide-integrated substrate for optical communication, a method for producing the substrate, and an optical transceiver using the substrate.

2. Description of the Background Art

Recent years have seen the development of communication technology relying on optical fibers, and researchers and engineers have developed low-cost, compact optical transceivers. For example, Ryuta Takahashi et al have developed an optical transceiver produced by combining two optical fibers, a laser diode (hereinafter referred to as LD) for signal transmission, and a photodiode (hereinafter referred to as PD) for signal reception on a single-crystal Si substrate having V-shaped grooves. The optical transceiver has been disclosed in a paper entitled "Packaging of optical semiconductor chips for SFF (small form factor) optical transceiver," which is included in the "Proceedings of the 1999 Electronics Society Conference of IEICE (The Institute of Electronics, Information and Communication Engineers of Japan)," Vol. 1, number C-3-28, page 133.

On the other hand, optical waveguides have been used for the miniaturization and cost reduction of optical transceivers. An example of such optical waveguides has been disclosed in the published Japanese patent application Tokukaihei 11-68705. According to the application, a combination of an optical waveguide and a multi-layer filter achieves a dual function of the signal transmission by a light wave having a wavelength of 1.3 $\mu$m and the signal reception by a light wave having a wavelength of 1.55 $\mu$m. This function is achieved by forming an optical waveguide on a single-crystal Si substrate to integrate an LD and a PD.

As explained above, it is essential to use an optical waveguide for integrating the optical-signal-transmitting and -receiving devices for an optical transceiver. Consequently, based on the foregoing two prior arts, a structure shown in FIGS. 6(a) and 6(b) can be conceived, for example, for obtaining a high-performance optical transceiver by using an optical waveguide. FIG. 6(a) is a plan view of the optical transceiver, and FIG. 6(b) is a side view showing the cross section along the line A–B shown in FIG. 6(a). The optical transceiver using a singlecrystal Si substrate is explained below. An $SiO_2$-family optical waveguide is formed on a single-crystal Si substrate 101. The optical waveguide comprises cores 103 and 104 for guiding light waves and a cladding layer 102 enclosing the cores 103 and 104. The cladding layer 102 is made of $SiO_2$, and the cores 103 and 104 are made of $SiO_2$ doped with $GeO_2$ and have a refractive index higher than that of the cladding layer 102. A substrate on which an optical waveguide is formed as explained above is referred to as an optical waveguide-integrated substrate 109.

The optical waveguide-integrated substrate 109 has an area 101-1 where no optical waveguide is formed. An LD 107 and a PD 108 are mounted on the area 101-1 for performing signal transmission and reception. To transmit optical signals, the LD 107 is driven by the transmitting signals to emit light waves, which in turn are sent into an optical fiber 105 through the core 103. To receive optical signals, incoming light waves having emerged from an optical fiber 106 enter the PD 108 through the core 104 to be converted into electrical signals. Although not shown in FIGS. 6(a) and 6(b), the signal-transmitting and -receiving functions can be augmented, for example, by forming a Bragg diffraction grating, which reflects a light wave having a specific wavelength, at some midpoint in the core 103 to select a transmitting wavelength as required or by inserting a wavelength-selecting filter, which selectively transmits a light wave having a specific wavelength, at some midpoint in the core 104 to obtain wavelength selectivity in the signal reception.

SUMMARY OF THE INVENTION

Under the current situation in which optical communication systems are becoming widespread, it is necessary to develop a compact, low-cost optical transceiver that has multiple functions and can be mass-produced. However, conventional optical transceivers have limitations in miniaturization, cost reduction, and in the integration of a multitude of optical-signal-transmitting and optical-signal-receiving devices for increasing functions, because their optical-signal-transmitting and -receiving devices are mounted only on one side of the substrate. To solve these problems, a novel structure has been required.

An object of the present invention is to offer a structure that can solve the above-described problems concurrently.

An optical waveguide-integrated substrate of the present invention comprises:

(a) a substrate;

(b) a first optical waveguide formed on part of one side (hereinafter referred to as the first side) of the substrate; and (c) a second optical waveguide formed on part of the other side (hereinafter referred to as the second side) of the substrate.

This structure increases the density of the integration of the optical waveguides, thereby enabling the miniaturization and cost reduction of the optical waveguide-integrated substrate. There has been an established concept that optical waveguides are to be formed on one side of a substrate. Forming optical waveguides on both sides of a substrate has never been considered.

The optical waveguide-integrated substrate may have the following features:

(a) the substrate is a single-crystal Si substrate; and (b) the first and second optical waveguides are made of an $SiO_2$-family material.

These features enable the formation of a multitude of optical waveguide-integrated substrates using a large-area single-crystal Si substrate at reduced costs and on a mass production basis.

The optical waveguide-integrated substrate may also have the following features:

(a) the substrate is a single-crystal Si substrate; and (b) the first and second optical waveguides are made of a polymer. These features also enable the formation of a multitude of optical waveguide-integrated substrates using a large-area single-crystal Si substrate at reduced costs and on a mass production basis.

The optical waveguide-integrated substrate may also have the following features:

(a) the substrate is a single-crystal Si substrate;

(b) the first optical waveguide is made of an $SiO_2$-family material; and (c) the second optical waveguide is made of a polymer.

According to these features, after the first optical waveguide made of an SiO$_2$ family material is formed at a relatively high temperature, the second optical waveguide made of a polymer can be formed easily at a relatively low temperature. Consequently, a multitude of optical waveguide-integrated substrates can be formed using a large-area single-crystal Si substrate at reduced costs and on a mass production basis.

A method of the present invention for producing an optical waveguide-integrated substrate comprises the following steps:

(a) preparing a substrate;
(b) first, forming a first optical waveguide on part of one side of the substrate; and
(c) then, forming a second optical waveguide on part of the other side of the substrate at a temperature different from that for forming the first optical waveguide.

The method may form the second optical waveguide at a temperature lower than that for forming the first optical waveguide.

An optical transceiver of the present invention comprises:

(a) an optical waveguide-integrated substrate comprising:
  (a1) a substrate;
  (a2) a first optical waveguide formed on part of one side (hereinafter referred to as the first side) of the substrate; and
  (a3) a second optical waveguide formed on part of the other side (hereinafter referred to as the second side) of the substrate;
(b) at least one optical-signal-transmitting device mounted on the remaining part of the first side of the substrate; and
(c) at least one optical-signal-receiving device mounted on the remaining part of the second side of the substrate.

The optical transceiver increases the density of the integration of optical-signal-transmitting and -receiving devices. As a result, the optical transceiver can be miniaturized and produced at reduced costs.

The optical transceiver may have the feature that the optical-signal-transmitting device or each optical-signal-transmitting device is a laser diode (hereinafter referred to as LD). This feature enables high-speed and long-distance transmission.

The optical transceiver may also have the feature that the optical-signal-receiving device or each optical-signal-receiving device is a photodiode (herein-after referred to as PD). This feature enables high-speed and long-distance transmission.

The optical transceiver may also have the feature that:

(a) the optical-signal-transmitting device or each optical-signal-transmitting device is an LD; and
(b) the optical-signal-receiving device or each optical-signal-receiving device is a PD.

This feature enables the miniaturization and cost reduction of the optical transceiver capable of high-speed and long-distance transmission.

The optical transceiver may also have the feature that:

(a) the substrate of the optical waveguide-integrated substrate is a single-crystal Si substrate;
(b) the first optical waveguide is made of an SiO$_2$-family material;
(c) the second optical waveguide is made of polyimide;
(d) the optical-signal-transmitting device or each optical-signal-transmitting device is an LD made of an InGaAsP-family material; and
(e) the optical-signal-receiving device or each optical-signal-receiving device is a PD made of InGaAs or an InGaAsP-family material.

This feature enables the optical transceiver to perform optical-signal-transmission and -reception in the most widely used 1.3- to 1.55-µm wave-length range in optical communication. This feature also enables the optical transceiver to be highly integrated, miniaturized, and cost-reduced.

The optical transceiver may further comprise:

(a) an LD-driving device mounted on the remaining part of the first side of the substrate; and
(b) a received-signal-amplifying device mounted on the remaining part of the second side of the substrate.

This structure enables the optical transceiver to integrate electronic circuits and achieve high performance.

The optical transceiver may have an outer shape formed by resin-molding. This feature enables the optical transceiver to have a neatly packaged shape. This feature also facilitates cost reduction and mass production of the optical transceiver.

According to the present invention, optical waveguides are formed on both sides of a substrate to produce an optical waveguide-integrated substrate, and the optical waveguide-integrated substrate is used to structure an optical transceiver. The optical transceiver of the present invention can be increased in integration density to be miniaturized and reduced in cost.

BRIEF DESCRIPTION OF THE DRAWINGS

In the drawings:

FIGS. 1(a) and 1(b) show the first embodiment of the optical transceiver of the present invention, in which FIG. 1(a) is a plan view and FIG. 1(b) is the cross section along the line A-B shown in FIG. 1(a);

FIGS. 2(a) to 2(c) show the production process of an optical waveguide-integrated substrate of the present invention, in which FIG. 2(a) is a plan view showing the entire single-crystal Si substrate, FIG. 2(b) is an enlarged plan view showing one of the optical waveguide-integrated substrates produced by using the Si substrate, and FIG. 2(c) is an end view seen from the A direction shown in FIG. 2(b) and shows the cross-sectional structure;

FIGS. 3(a) and 3(b) show the second embodiment of the optical transceiver of the present invention that integrates a plurality of optical-signal-transmitting devices and a plurality of optical-signal-receiving devices, in which FIG. 3(a) is a plan view and FIG. 3(b) is the cross section along the line A-B shown in FIG. 3(a);

FIGS. 4(a) and 4(b) show the third embodiment of the optical transceiver of the present invention that integrates LDs, an LD-driving IC, PDs, and a signal-amplifying IC, in which FIG. 4(a) is a plan view and FIG. 4(b) is the cross section along the line A-B shown in FIG. 4(a);

FIGS. 5(a) and 5(b) show the fourth embodiment of the optical transceiver of the present invention that provides an epoxy resin molding forming the outer shape of the transceiver, in which FIG. 5(a) is a plan view and FIG. 5(b) is the cross section along the line A-B shown in FIG. 5(a); and FIGS. 6(a) and 6(b) show an optical-waveguide-incorporating optical transceiver conceived based on the conventional technology, in which FIG. 6(a) is a plan view and FIG. 6(b) is the cross section along the line A-B shown in FIG. 6(a).

DETAILED DESCRIPTION OF THE INVENTION

Embodiments of the present invention are explained below by referring to the accompanying drawings. To avoid duplicated explanations, the same signs are allocated to the same members throughout the drawings.

Figure 1:
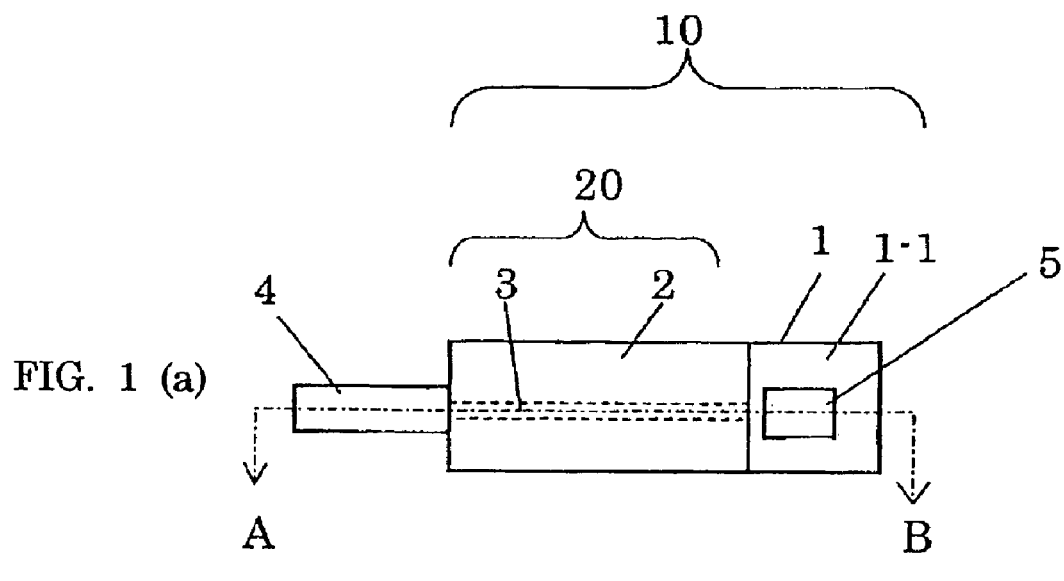
Figure 1:
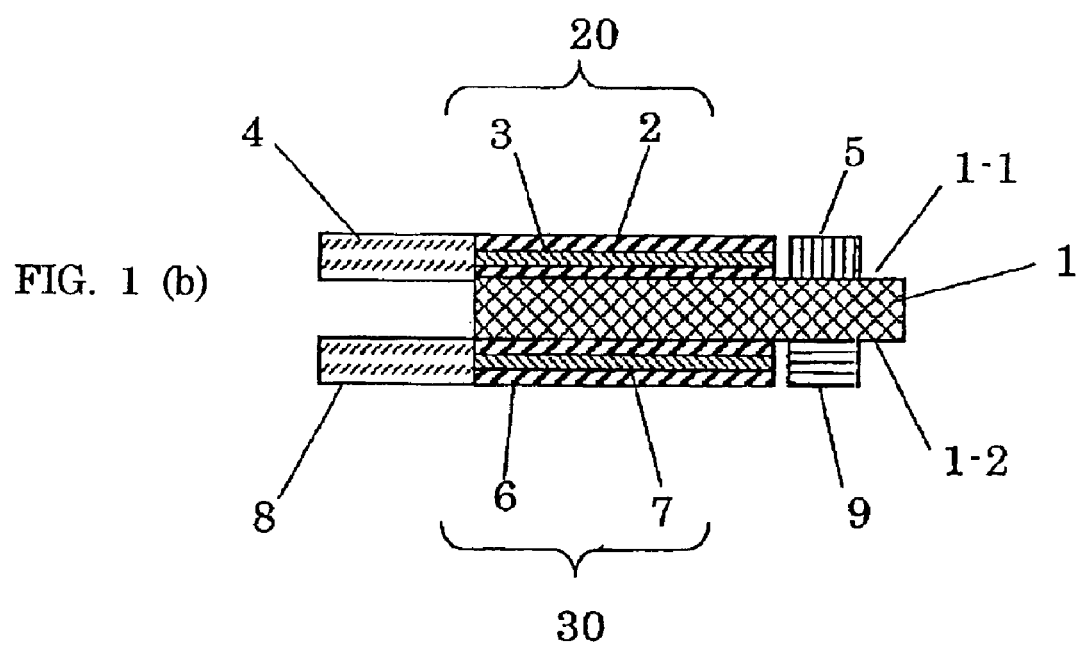

FIG. 1(a) is a plan view showing the first embodiment of the optical transceiver of the present invention, and FIG. 1(b) is the cross section along the line A-B shown in FIG. 1(a). Using the first embodiment as an example, the present invention is explained in general below. The following fundamental matters including the production method are applied to the other embodiments, i.e., the second to fourth embodiments explained below, except for the structural differences. A first optical waveguide 20 is formed on part of one side (hereinafter referred to as the first side) of a substrate 1. The first optical waveguide 20 comprises a core 3 for guiding light waves and a cladding layer 2 enclosing the core 3. A second optical waveguide 30 is formed on part of the other side (hereinafter referred to as the second side) of the substrate 1. The second optical waveguide 30 comprises a core 7 for guiding light waves and a cladding layer 6 enclosing the core 7. A substrate that has optical waveguides formed on both sides as explained above is referred to as an optical waveguide-integrated substrate 10.

Figure 6:
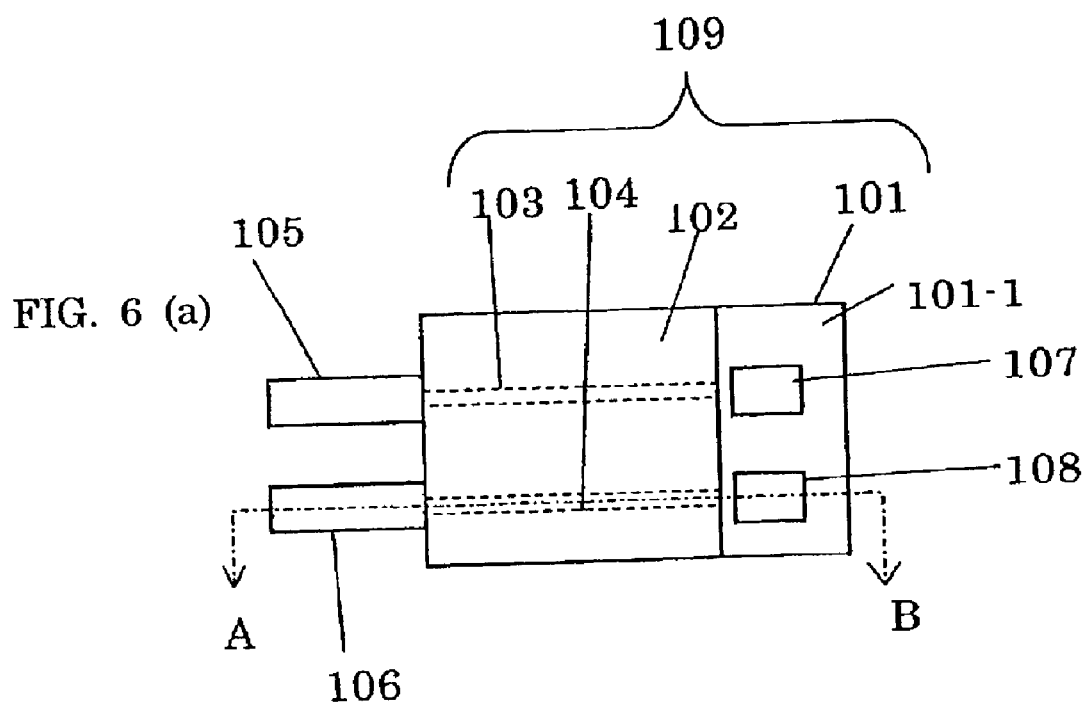
Figure 6:
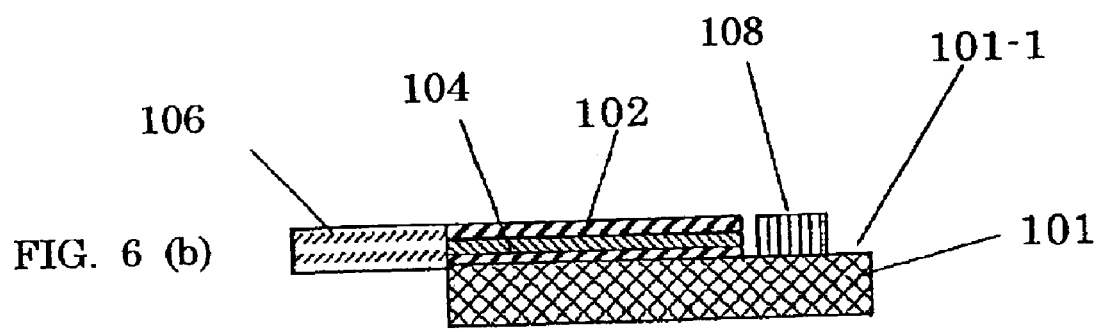

An LD 5 is mounted on the remaining part 1—1 of the first side of the optical waveguide-integrated substrate 10. A PD 9 is mounted on the remaining part 1–2 of the second side of the substrate 10. A signal-transmitting optical fiber 4 is bonded to the mating end face of the optical waveguide 20 formed on the first side of the substrate 10. Similarly, a signal-receiving optical fiber 8 is bonded to the optical waveguide 30. This structure can incorporate optical-signal-transmitting and -receiving devices on an optical waveguide-integrated substrate having about half the area of the substrate shown in FIGS. 6(a) and 6(b), which is conceived based on the conventional technology.

The substrate of the optical waveguide-integrated substrate may be produced by using single-crystal Si, quartz glass, or sapphire. Of these materials, it is desirable to use single-crystal Si because a large substrate can be obtained and a processing technique using photolithography can be employed.

The optical waveguides may be produced by using an $SiO_2$-family material (for example, $GeO_2$-doped $SiO_2$ for the core and $SiO_2$ for the cladding layer), a $GeO_2$-family material, Si, an InP-family material, a GaAs-family material, or an oxide crystal material such as $LiNbO_3$, depending on the purpose of the use and the wavelength band to be used. Of these materials, it is desirable to use an $SiO_2$-family material because it can be formed most easily on the single-crystal Si substrate. The optical waveguides may be produced by using a method such as the flame hydrolysis deposition (FHD) method or the chemical vapor deposition (CVD) method. The optical waveguides may be formed on both sides of the single-crystal Si substrate either by forming the first and second optical waveguides concurrently by the FHD method or by, first, forming the first optical waveguide on the first side by the FHD method and, then, forming the second optical waveguide on the second side by the CVD method at a temperature lower than that for forming the first optical waveguide.

The optical waveguides may also be produced by using a polymer that can transmit the light wave to be used. The types of polymers include polyurethane, epoxy resin, polymethyl methacrylate (PMMA). In recent years, there has been a particular increase in the commercial application of optical waveguides made of polyimide or fluorinated polyimide. An example of such an optical waveguide has been disclosed by Tatemi Ido in a paper entitled "Polymer PLC (planar light-wave circuit) transceiver module," which is included in the "Proceedings of the 2001 IEICE general conference," number C-3-68, page 233. In this transceiver module, an optical waveguide is formed on a thin $SiO_2$ insulating layer laminated on a single-crystal Si substrate. The optical waveguide is composed of an inner cladding layer with a thickness of 5 $\mu$m, a core with a size of 6.5×6.5 $\mu$m, and an outer cladding layer with a thickness of at least 8.5 $\mu$m. The optical waveguide is used for an optical transceiver for bi-directional communication using light waves having wavelengths of 1.3 and 1.55 $\mu$m.

As described above, the present invention can also use a polymer optical waveguide. The use of a polymer facilitates the formation of a uniform layer of an optical waveguide on a large-area single-crystal Si substrate by the spin-coating method. The polymer optical waveguide is suitable for mass production because it can be processed at relatively low temperatures in comparison with the $SiO_2$-family optical waveguide and the material itself is less costly. Of polymers, it is desirable to use polyimide. In particular, when fluorinated polyimide is used, the material can withstand temperatures as high as 300 to 350° C. at the time of the mounting of an LD and PD.

In the present invention, in particular, when, first, an $SiO_2$-family optical waveguide is formed at high temperature (for example, about 1,000° C. when the FHD method is employed) on one side of the substrate and, then, a polymer optical waveguide is formed at a lower temperature (about 350° C. for the highest processing temperature) on the other side of the substrate, the formation of the optical waveguides is facilitated.

The type of the optical waveguide to be coupled with the optical-signal-transmitting or -receiving device can be determined by considering the property of the optical waveguide and the required performance of the substrate when the device is mounted.

The above-described procedure can produce an optical waveguide-integrated substrate suitable for a highly integrated, compact, and less costly optical transceiver.

The optical waveguide-integrated substrate 10 mounts an LD and PD to produce an optical transceiver. As shown in FIGS. 1(a) and 1(b), an LD 5 for signal transmission is mounted on the remaining part 1—1, where no optical waveguide is formed, of the first side of the single-crystal Si substrate 1. Similarly, a PD 9 for signal reception is mounted on the remaining part 1–2 of the second side of the substrate 1. Optical fibers 4 and 8 integrated in ceramic ferrules are bonded to the optical waveguides and resin-fixed to complete the optical transceiver.

The LD may be produced by using a GaAs-family, GaAlAs-family, InP-family, or InGaAsP-family material. The PD may be produced by using Si, Ge, InGaAs, or an InGaAsP-family material. Of these groups, it is desirable to use an LD produced by using an InGaAsP-family material and a PD produced by using InGaAs or an InGaAsP-family material for light waves having wavelengths ranging from 1.3 to 1.6 $\mu$m because they stably operate with high performance at this wavelength range in which transmission loss is low.

Figure 2:
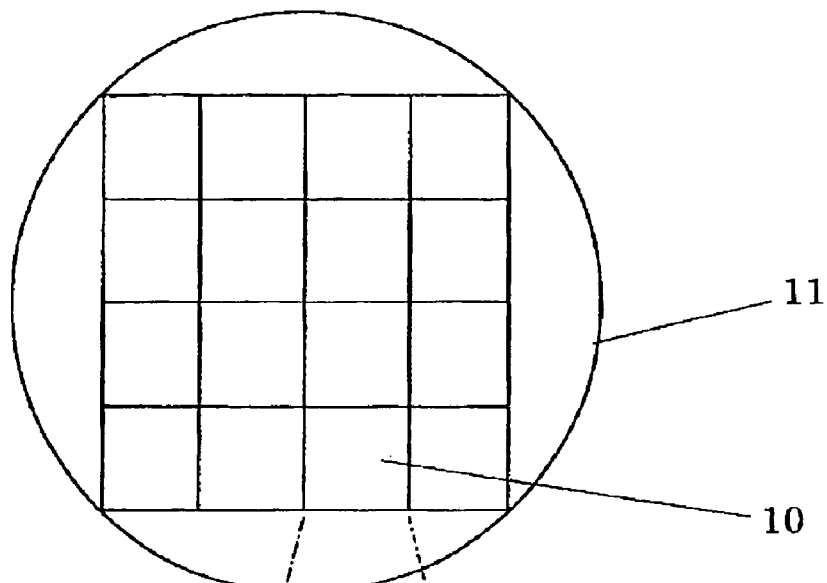
Figure 2:
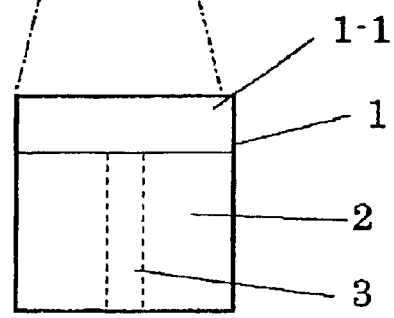
Figure 2:
Figure 2:
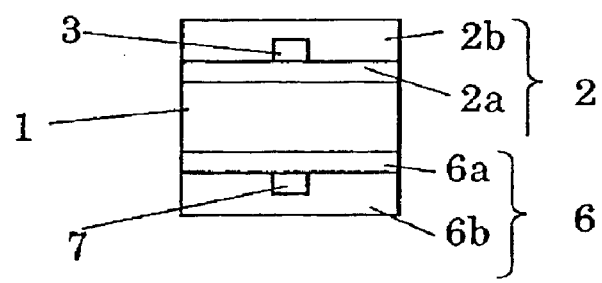

The production process of the first embodiment shown in FIGS. 1(a) and 1(b) is explained below. FIGS. 2(a) to 2(c) show the structure and production process of the optical waveguide-integrated substrate 10 of the present invention. As shown in FIG. 2(a), a single-crystal Si substrate is used as a substrate 11 for forming a multitude of optical waveguides. A single-crystal Si substrate is commonly used because a large, uniform wafer can be obtained upon which an $SiO_2$-family optical waveguide (for example, $GeO_2$-doped $SiO_2$ for the core and $SiO_2$ for the cladding layer) can be formed. In this case, a single-crystal Si substrate having a thickness of 1 mm and a diameter of 200 mm is used. An array with optical waveguide-integrated substrates 10 is formed using the Si substrate as shown in FIG. 2(a). Each of the optical waveguide-integrated substrates 10 has a structure shown in FIG. 2(b). The substrate 10 in FIG. 2(b) is enlarged in for easy recognition. The actual width and length of the substrate 10 are 5 mm and 8 mm respectively. FIG. 2(c) is an end view seen from the A direction shown in FIG. 2(b) and shows the structure in which cladding layers 2 and 6 and cores 3 and 7 are formed as the components of the optical waveguides formed on both sides of a substrate 1.

The first optical waveguide on the top side of the substrate 1 shown in FIG. 2(c) is formed by the method explained below. An inner cladding layer 2a made of $SiO_2$ is formed on the single-crystal Si substrate by the FHD method. To obtain a linear core portion 3, first, a layer of $GeO_2$-doped $SiO_2$ is formed on the inner cladding layer 2a. Then, the portions other than the linear core portion 3 are removed by photolithography and etching. An outer cladding layer 2b made of $SiO_2$ is formed by covering the entire top surface. The outer cladding layer 2b has a thickness of 20 to 30 $\mu$m at the place where the core portion 3 is sandwiched. The inner cladding layer 2a has the same thickness of 20 to 30 $\mu$m. The size of the core portion 3 is (6 to 8)×(6 to 8) $\mu$m. The relative refractive-index difference between the core and cladding is about 0.4% to about 0.7%.

Similarly, the second optical waveguide on the bottom side of the substrate 1 shown in FIG. 2(c) is formed. In this embodiment, the second optical waveguide has the same structure as that of the first optical waveguide. When the optical-signal-transmitting and -receiving devices use different wavelengths, different waveguide structures may be employed as their optimum structures. In this embodiment, the second optical waveguide is formed by using fluorinated polyimide, which can be formed at a temperature lower than that for forming $SiO_2$. The production procedure of the fluorinated polyimide optical waveguide including the procedure for forming the waveguide pattern is the same as that of the $SiO_2$-family optical waveguide except that the layer is formed by the spin-coating method followed by baking at about 350° C. As shown in FIG. 2(c), an inner cladding layer 6a is formed by using fluorinated polyimide. To obtain a linear core portion 7, first, a layer of fluorinated polyimide having a different fluorine concentration is formed on the inner cladding layer 6a. Then, the portions other than the linear core portion 7 are removed by photolithography and etching. An outer cladding layer 6b made of the same fluorinated polyimide as that of the inner cladding layer 6a is formed by covering the entire surface. The outer cladding layer 6b has a thickness of 20 to 30 $\mu$m at the place where the core portion 7 is sandwiched. The inner cladding layer 6a has the same thickness of 20 to 30 $\mu$m. The size of the core portion 7 is (6 to 8)×(6 to 8) $\mu$m. The relative refractive-index difference between the core and cladding is about 0.4% to about 0.7%.

In this embodiment, in particular, first, an $SiO_2$-family optical waveguide is formed at high temperature (for example, about 1,000° C. by employing the FHD method) on one side of the substrate and, then, a polymer optical waveguide is formed at a lower temperature (about 350° C. for the highest processing temperature) on the other side of the substrate. Because the heat process in the succeeding step can be performed at lower temperatures, the formation of the optical waveguide is facilitated.

The optical waveguide-integrated substrate 10 mounts an LD and PD to produce an optical transceiver. As shown in FIGS. 1(a) and 1(b), an LD 5, which is composed of an InGaAsP-family material and emits a light wave having a wavelength of 1.3 $\mu$m, is mounted on the remaining part 1—1 of the first side of the single-crystal Si substrate 1. Similarly, a PD 9, which has an InGaAs photosensitive layer and is a side-illuminated type, is mounted on the remaining part 1–2 of the second side of the single-crystal Si substrate 1. Subsequently, optical fibers 4 and 8 integrated in ceramic ferrules are bonded to the optical waveguides and resin-fixed to complete the optical transceiver. As a matter of course, the single-crystal Si substrate is provided with metallized wiring patterns for mounting the LD and PD, the individual components are electrically connected by wiring, and the entire optical transceiver is fixed onto a lead frame to be electrically connected by gold wires. To avoid complexity, these components are omitted in FIGS. 1(a) and 1(b).

Figure 3:
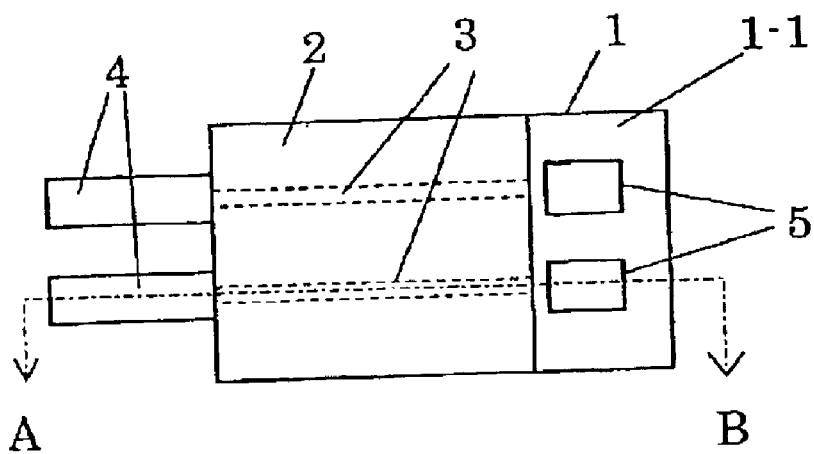
Figure 3:
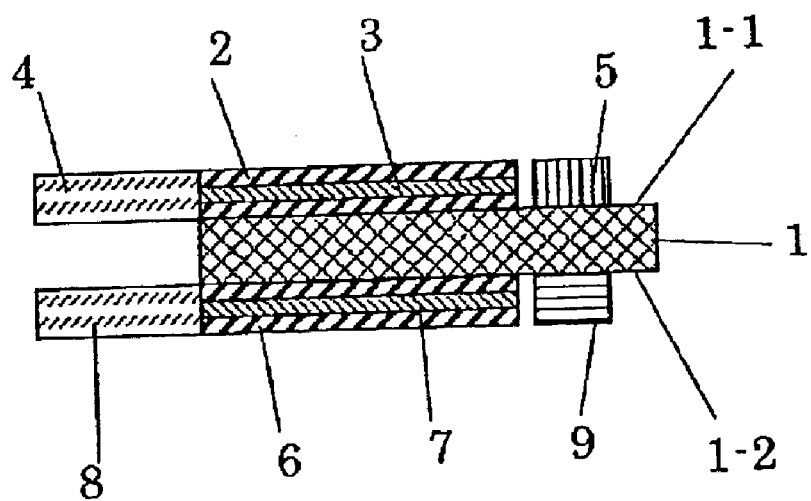

The second embodiment is shown in FIGS. 3(a) and 3(b). FIG. 3(a) is a plan view, and FIG. 3(b) is the cross section along the line A-B shown in FIG. 3(a). As shown in FIGS. 3(a) and 3(b), a first optical waveguide comprising two cores 3 and a common cladding layer 2 is formed on part of one side of a single-crystal Si substrate 1. Two LDs 5 are mounted on the remaining part 1—1 as the two optical-signal-transmitting devices. Similarly, a second optical waveguide comprising two cores 7 and a common cladding layer 6 is formed on part of the other side of the substrate 1. Two PDs 9 are mounted on the remaining part 1–2 as the two optical-signal-receiving devices. Thus, a plurality of optical-signal-transmitting devices and a plurality of optical-signal-receiving devices are integrated onto one optical waveguide-integrated substrate. This structure enables highly integrated intercomputer communication apparatuses.

Figure 4:
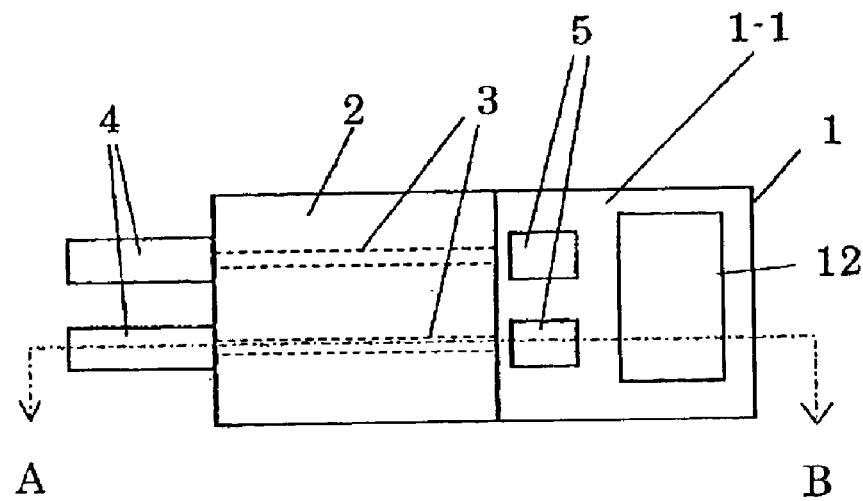
Figure 4:
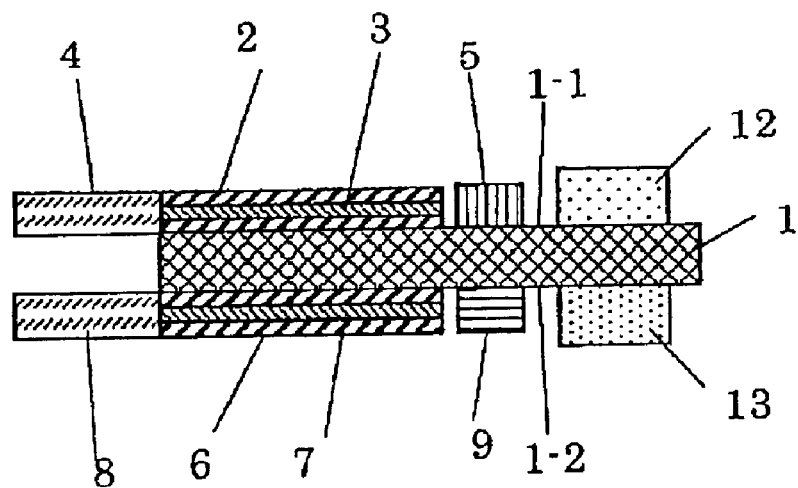

The third embodiment is shown in FIGS. 4(a) and 4(b). FIG. 4(a) is a plan view, and FIG. 4(b) is the cross section along the line A-B shown in FIG. 4(a). As shown in FIGS. 4(a) and 4(b), a first optical waveguide comprising two cores 3 and a common cladding layer 2 is formed on part of one side of a single-crystal Si substrate 1. Two LDs 5 and their driving IC 12 are mounted on the remaining part 1—1. Similarly, a second optical waveguide comprising two cores 7 and a common cladding layer 6 is formed on part of the other side of the substrate 1. Two PDs 9 and an output signal-amplifying IC 13 are mounted on the remaining part 1–2. This structure decreases the distance between the LDs and the driving IC. The decreased distance reduces the impedance of the wiring, thereby enabling the high-speed operation of signal transmission. Similarly, the decreased distance between the PDs and the amplifying IC decreases the impedance of the wiring, thereby enabling the high-sensitivity and high-speed operation of signal reception. These superior features enable the optical transceiver to be used, for example, for the parallel transmission of signals between 8-channel computers.

Figure 5:
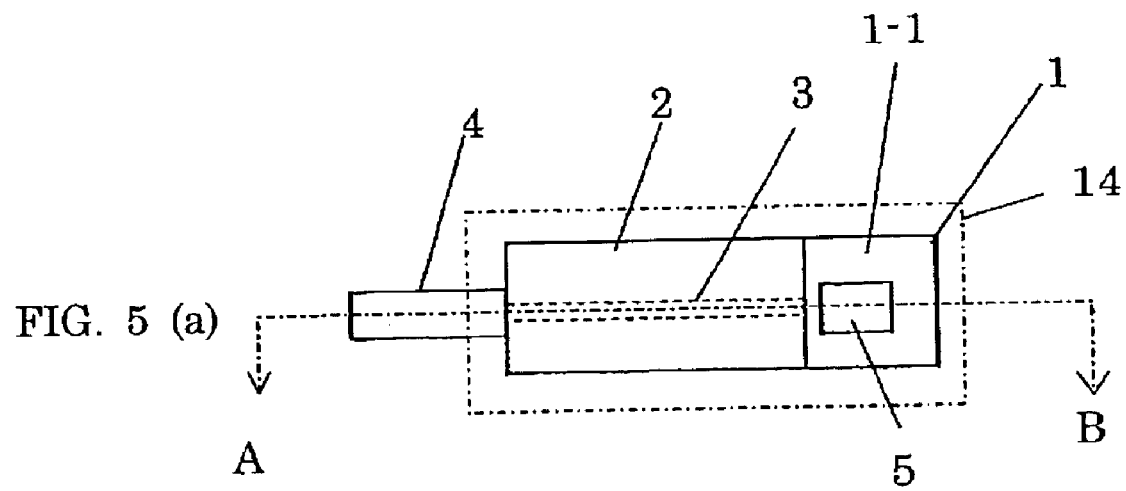
Figure 5:
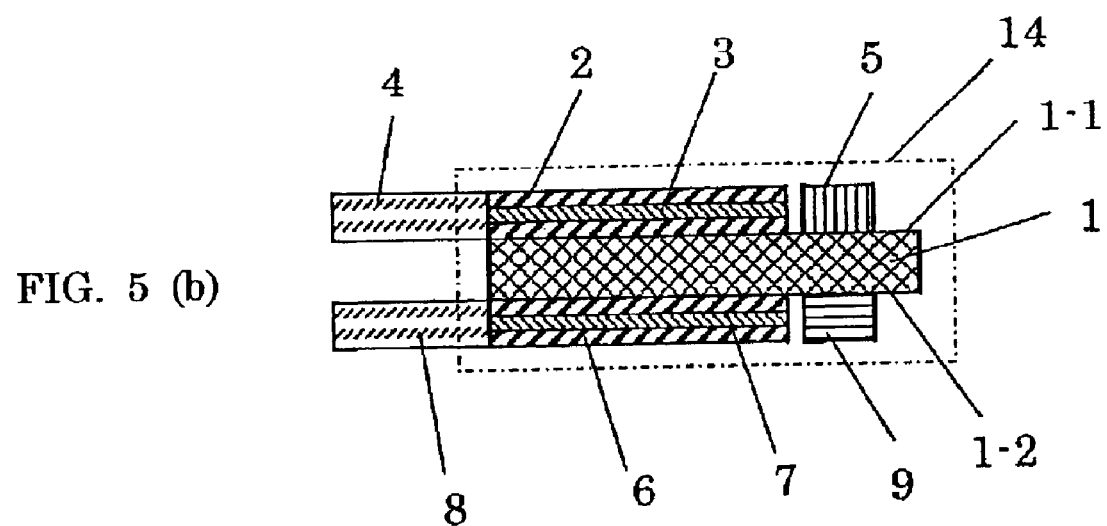

The fourth embodiment is shown in FIGS. 5(a) and 5(b). FIG. 5(a) is a plan view, and FIG. 5(b) is the cross section along the line A-B shown in FIG. 5(a). As shown by an outer shape 14 in FIGS. 5(a) and 5(b), the main body of the optical transceiver except the end portions of the optical fibers and the lead wires (not shown in the drawings) for the connection to the outside circuits is enclosed with an epoxy resin-family molding material by the transfer molding method using a metal mold. This molding protects the optical transceiver against the environment and facilitates the handling when the optical transceiver is fixed onto a substrate for electronic circuits.

The above-explained embodiments are a few examples of the present invention. The present invention is not limited to these embodiments in terms of the material for the optical waveguides, the types of LD and PD, the method for fixing the optical fiber, and the number of integrated optical-signal-transmitting and -receiving devices.

As described above, the optical transceiver of the present invention has a special feature in that optical waveguides are formed on both sides of the substrate This feature unprecedentedly increases the degree of component integration and thereby enables the miniaturization and cost reduction of the optical transceiver.

What is claimed is:

1. A method for producing an optical waveguide-integrated substrate, the method comprising the steps of:
   (a) preparing a substrate;
   (b) first, forming a first optical waveguide on part of one side of the substrate; and
   (c) then, forming a second optical waveguide on part of the other side of the substrate at a temperature different from that for forming the first optical waveguide.

2. A method as defined by claim 1, wherein the second optical waveguide is formed at a temperature lower than that for forming the first optical waveguide.

3. An optical transceiver, comprising:
   (a) a substrate;
   (b) a first optical waveguide formed on part of one side (hereinafter referred to as the first side) of the substrate;
   (c) at least one optical-signal-transmitting device and an optical-signal-receiving device mounted on the first side of the substrate; and
   (d) a second optical waveguide formed on part of the other side (hereinafter referred to as the second side) of the substrate; and
   (e) at least one of an optical-signal-transmitting device and an optical-signal-receiving device mounted on the second side of the substrate.

4. An optical transceiver as defined by claim 3, wherein the optical-signal-transmitting device or each optical-signal-transmitting device is a laser diode (hereinafter referred to as LD).

5. An optical transceiver as defined by claim 3, wherein the optical-signal-receiving device or each optical-signal-receiving device is a photodiode (hereinafter referred to as PD).

6. An optical transceiver as defined by claim 3, wherein:
   (a) the or each optical-signal-transmitting device is an LD; and
   (b) the or each optical-signal-receiving device is a PD.

7. An optical transceiver as defined by claim 3, wherein:
   (a) the substrate of the optical waveguide-integrated substrate is a single crystal Si substrate;
   (b) the first optical waveguide is made of an $SiO_2$-family material;
   (c) the second optical waveguide is made of polyimide;
   (d) the optical-signal-transmitting device or each optical-signal-transmitting device is an LD made of an InGaAsP-family material; and
   (e) the optical-signal-receiving device or each optical-signal-receiving device is a PD made of InGaAs or an InGaAsP-family material.

8. An optical transceiver as defined by claim 7, wherein an outer shape of the optical transceiver is formed by covering the entire body excluding the ends of optical fibers by resin-molding.

9. An optical transceiver as defined by claim 3, the optical transceiver further comprising:
   (a) an LD-driving device mounted on the remaining part of the first side of the substrate; and
   (b) a received-signal-amplifying device mounted on the remaining part of the second side of the substrate.

10. An optical transceiver as defined by claim 9, wherein an outer shape of the optical transceiver is formed by covering the entire body excluding the ends of optical fibers by resin-molding.

11. An optical waveguide-integrated substrate, comprising:
    (a) a substrate;
    (b) a first optical waveguide formed on part of one side of the substrate; and
    (c) a second optical waveguide formed on part of the other side of the substrate,
    wherein the second optical waveguide is formed at a temperature different from that for forming the first optical waveguide.

12. An optical waveguide-integrated substrate as defined by claim 11, wherein the second optical waveguide is formed at a temperature lower than that for forming the first optical waveguide.

13. An optical waveguide-integrated substrate as defined by claim 11, wherein:
    (a) the substrate is a single-crystal Si substrate; and
    (b) the first and second optical waveguides are made of an $SiO_2$-family material.

14. An optical waveguide-integrated substrate as defined by claim 11, wherein:
    (a) the substrate is a single-crystal Si substrate; and
    (b) the first and second optical waveguides are made of a polymer.

15. An optical waveguide-integrated substrate as defined by claim 14, wherein the polymer is polyimide.

16. An optical waveguide-integrated substrate as defined by claim 11, wherein:
    (a) the substrate is a single-crystal Si substrate;
    (b) the first optical waveguide is made of an $SiO_2$-family material; and
    (c) the second optical waveguide is made of a polymer.

17. An optical waveguide-integrated substrate as defined by claim 16, wherein the polymer is polyimide.

* * * * *